Figure 1:
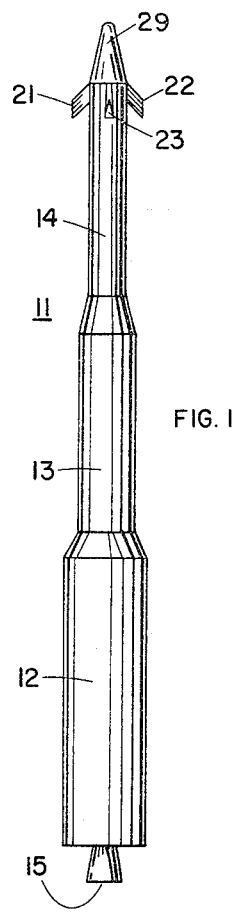

Oct. 4, 1966

R. W. CUBBISON ETAL  3,276,376

THRUST AND DIRECTION CONTROL APPARATUS

Filed Sept. 30, 1964

INVENTORS
JAMES F. CONNORS
ROBERT W. CUBBISON

BY

ATTORNEYS

United States Patent Office 3,276,376
Patented Oct. 4, 1966

3,276,376
THRUST AND DIRECTION CONTROL APPARATUS
Robert W. Cubbison, North Royalton, and James F. Connors, North Olmsted, Ohio, assignors to the United States of America as represented by the Administrator of the National Aeronautics and Space Administration
Filed Sept. 30, 1964, Ser. No. 400,617
7 Claims. (Cl. 244—3.22)

The invention described herein may be manufactured and used by or for the Government of the United States of America for governmental purposes without the payment of any royalties thereon or therefor.

The present invention relates to an apparatus for use in providing both thrust and attitude control for a vehicle.

The instant invention is applicable to all types of aircraft, rockets, missiles, satellites, and space vehicles.

Hitherto, various methods have been employed for providing thrust and controlling the direction of air and space type vehicles. For vehicles operable in the atmosphere, a canard surface configuration is one means that has been used to control direction. For vehicles operable in both the atmosphere and space, some of the more conventional methods used in controlling the attitude include gimballing the main engines, using mechanical jet deflectors on the main engines, or expelling additional mass through the main engines. The main engines are generally either located to the rear of the vehicle or in the case of the vehicles comprising a plurality of stages, to the rear of each of said stages. Another arrangement consists of a plurality of gyroscopically mounted pull-type booster rockets mounted on the front of the payload portion of the vehicle. However, for the large vehicles, all of the above methods incur severe penalties in terms of the structural weight and mechanical complexity. This in turn causes a reduction of the payload or a reduction in thrust capabilities.

Another disadvantage of the prior art systems which employ the main engines for obtaining direction control is that they fail to utilize the aerodynamic potential that occurs over a large part of the trajectory.

The general purpose of this invention is to provide for an apparatus which embraces all the advantages of similarly employed prior art devices and possesses none of the aforementioned disadvantages. To attain this, the present invention contemplates a unique combination of a jet nozzle housed in a movable canard surface configuration (fin) which is mounted on the uppermost stage of the vehicle.

This unique assembly is used in the following manner: at launch and in the low Q and space portion of the mission, a pulse or reaction jet leading to the exhaust nozzle provides the necessary control as the dynamic pressure is too low to generate the required forces. In the sensible atmosphere, pitch, yaw, and roll control moments are generated by deflecting either equal or differential amounts or all parts of the canard surfaces. This produces forces in a manner similar to that of a conventional aerodynamic control surface.

An object of this invention is to provide for a new and improved apparatus for controlling the attitude of a vehicle.

Another object of this invention is to provide for a new and improved apparatus for controlling the attitude of a vehicle in both the atmosphere and in space.

Yet, still another object of this invention is to provide for a vehicle attitude control apparatus which utilizes the mechanical advantage of a long moment arm.

Still another object of this invention is to provide for a vehicle control apparatus which provides continuous control throughout all phases of flight.

Yet, still another object of this invention is to provide for a vehicle attitude control system which utilizes both aerodynamic and reaction control.

Yet, still another object of this invention is to provide for a vehicle attitude control system which provides for recovery of the vehicle at a predetermined location.

Still another object of this invention is to provide for a vehicle attitude control apparatus which does not utilize the main engines.

Figure 2:
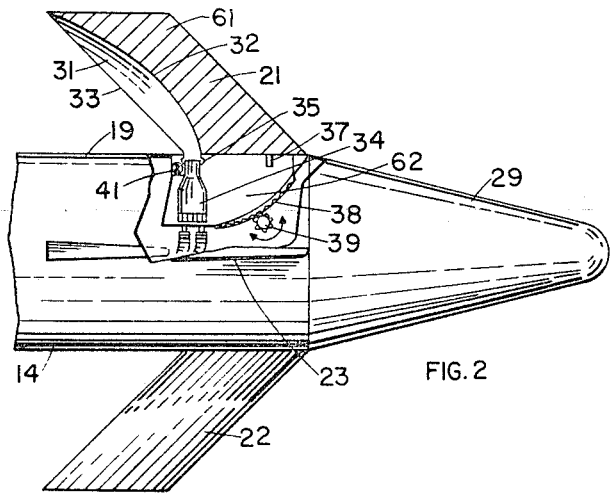
Figure 3:
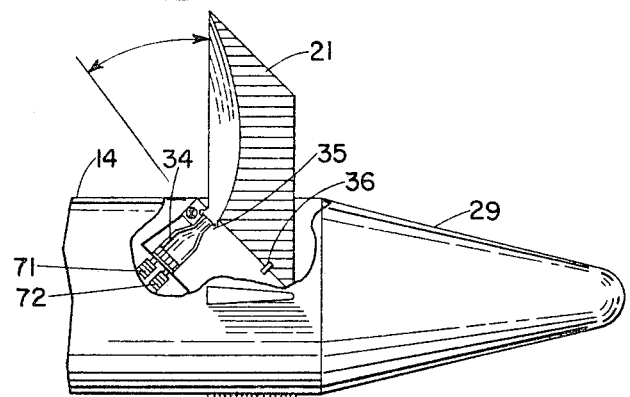
Figure 4:
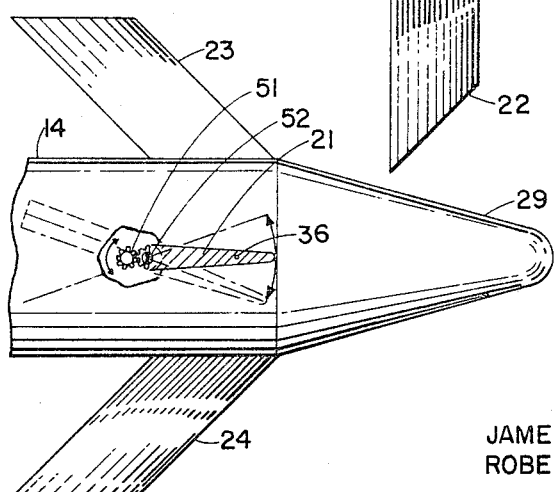

Other objects and many of the attendant advantages of this invention will be readily appreciated as the same becomes better understood by reference to the following detailed description when considered in connection with the accompanying drawings in which like reference numerals designated like parts throughout the figures thereof, and wherein FIG. 1 is a view in elevation of a missile having a plurality of canard nozzle assemblies mounted thereon; FIG. 2 is an enlarged view in front elevation of the nose portion of the missile shown in FIG. 1 having the canard assemblies in a swept back position; FIG. 3 is an enlarged view in front elevation of the nose portion of the missile shown in FIG. 1 having the canard assemblies extended and partly in section; and FIG. 4 is an enlarged plan view partly in section of the nose portion of the vehicle shown in FIG. 1.

Referring now to the drawings wherein like reference characters designate like or corresponding parts throughout the several views, there is shown in FIG. 1 a vehicle 11 having a plurality of stages 12, 13, and 14. The main propulsion system 15 is shown mounted on the rear of the first stage 12. In the embodiment shown, the vehicle comprises three stages, however, the vehicle could comprise one or any number of such stages. Near the nose or payload portion 19 of the uppermost stage 14 of the vehicle, is mounted a plurality of identical exhaust nozzle fin assemblies 21, 22, and 23.

In the embodiment shown in FIGS. 1 through 4 there are four exhaust nozzle fin assemblies (with one being hidden) however, arrangements containing a different number of assemblies are contemplated as being within the scope of this invention.

Also, although the canard nozzle assemblies 21, 22, and 23 are shown as being substantially trapezoidal in cross-sectional shape, said assemblies could be swept back straight or any other type of aerodynamic canard configuration that is well known in the art.

Referring now to FIG. 2 there is shown an enlarged view partly in section of the nose portion of the vehicle shown in FIG. 1. As can be seen from the drawing, the canard nozzle assembly 21 comprises an upper section 61 and a lower section 62. Section 61 is shaped in the form of a canard surface and extends entirely beyond the surface or skin 19 of the vehicle. Formed integrally or housed within the canard surface at the trailing edge is an exhaust nozzle 31. In the embodiment shown, the exhaust nozzle 31 is an asymmetric external-expansion nozzle having a penshaped type configuration; this type of nozzle being fully disclosed in U.S. Patent No. 3,080,711.

As is evident from the drawings, the nozzle sidewalls 32 and 33 have been flattened out slightly to conform to the canard surface configurations. Nozzles other than the penshaped type could also be used in this assembly. The entrance end of the exhaust nozzle 31 connects to a combustion chamber 34 which is housed in the bottom section of the assembly 62. The fuel and oxidizer are supplied to the combustion chamber 34 through flexible couplings 71 and 72. When in the position shown in FIG. 2, the lower surface of the fin portion 61 and the upper surface of the lower portion 62 are flush. By means of a slip joint 35 or other suitable mechanical linkage 35 located at the throat of the nozzle 31, fin section 61 is swingable about a vertical axis relative to lower section 62. Means are also provided for locking the two sections together. In the embodiment shown, said means are in the form of a slot and pin arrangement 36, 37.

Means are also provided for rotating the entire assembly 21 about a second or horizontal axis. This is accomplished by means of a pivot member 41 and a suitable gearing arrangement 38, 39. A slot is provided for in the skin of the vehicle to permit this rotation.

For each of the two aforementioned rotational or swingable movements, the gear linkages for the two opposite fin assemblies may be coupled or may operate separately. In the embodiment disclosed herein, the mechanical linkages for rotating opposite fin assemblies are coupled whereas the mechanical linkages for pivoting one section of an assembly relative to the other are not coupled.

Hydraulic, bell-crank type, or a combination of the latter two systems could also be employed in place of the mechanical gearing shown. Also, although not shown, the mechanical linkages are connected to a suitable guidance or servo-mechanism system.

In operation, the nozzle assemblies function as follows: at launch and in the low Q and space portion of the mission, a pulse operated reaction jet acting through the penshaped nozzle 31 controls the direction of the vehicle, with the nozzles being in either one of the positions as shown in FIGS. 2 and 3 or a position intermediate therewith. In the sensible atmosphere, direction control is obtained by means of the movable canard surface with said canard being in a position such as that shown in FIG. 4. If desired, the pulse operated reaction jet could also be used in this region.

The instant invention can also be used for final stage propulsion wherein said penshaped nozzle may be sized to provide the required final stage thrust without appreciable loss in performance when the device is used for attitude control at launch. It is to be understood, of course, that the foregoing disclosure relates to only a preferred embodiment of the invention and that numerous modifications or alterations may be made therein without departing from the spirit and scope of the invention as set forth in the appended claims.

We claim:
1. In a vehicle having a front end and a rear end, the improvement comprising a fin having a leading edge and a trailing edge, said fin being movably mounted on the front end of the vehicle for rotation about two axes controlling the direction of the vehicle, said two axes being perpendicular to each other and lying in a plane normal to the longitudinal axis of said vehicle, and a jet engine having an asymmetric external-expansion type exhaust nozzle housed in said fin and exiting through the trailing edge thereof for providing thrust and controlling the direction of said vehicle, said exhaust nozzle having sidewalls shaped so as to define an aerodynamic control surface on said fin.

2. Apparatus according to claim 1 wherein said movable fin comprises an upper section and a lower section, and wherein said exhaust nozzle is housed in said upper section and wherein said jet engine includes a combustion chamber, said combustion chamber being housed in the lower section of the fin.

3. Apparatus according to claim 2 and wherein said upper section is rotationally movable relative to said lower section.

4. Apparatus according to claim 3 and further including locking means for preventing movement of the upper section relative to the lower section.

5. In a vehicle of the class described having a front end and a rear end, a system for providing thrust and direction control comprising: a pair of aerodynamic control surfaces mounted for swingable and rotational movement on the front end of the vehicle, said aerodynamic control surfaces being mounted on opposite sides of the vehicle and lying in a plane passing through the longitudinal axis of the vehicle and a jet engine connected to each of said aerodynamic control surfaces, said jet engine including an exhaust nozzle housed within each of said aerodynamic control surfaces.

6. In a vehicle according to claim 5, said system further including means connected to said two aerodynamic control surfaces to provide for simultaneous and equal swingable movements of said aerodynamic control surfaces.

7. In a vehicle of the class described having a front end and a rear end, a system for providing thrust and direction control comprising: a plurality of aerodynamic control surfaces mounted for swingable and rotational movement on the front end of the vehicle, said aerodynamic control surfaces lying in a plane passing through the longitudinal axis of the vehicle and a jet engine connected to each of said aerodynamic control surfaces, said jet engine including an exhaust nozzle housed within each of said aerodynamic control surfaces.

References Cited by the Examiner

UNITED STATES PATENTS 3,056,258  10/1962  Marchant et al. _____ 60—35.55
3,080,711   3/1963  Connors _____ 60—35.55

OTHER REFERENCES

Cubbison, R. W., Asymmetric "Penshape" Nozzles in Jet-Canard Configurations for Attitude Control, N.A.S.A. TN D-1561, September 1963, pp. 1–15.

BENJAMIN A. BORCHELT, *Primary Examiner.*

V. R. PENDEGRASS, *Assistant Examiner.*